(12) United States Patent
Wu

(10) Patent No.: US 12,515,505 B2
(45) Date of Patent: Jan. 6, 2026

(54) ADJUSTABLE SUPPORTING STRUCTURE

(71) Applicant: Hongbo Wu, Zhejiang (CN)

(72) Inventor: Hongbo Wu, Zhejiang (CN)

(73) Assignee: Hongbo Wu, Ningbo (CN)

( * ) Notice: Subject to any disclaimer, the term of this patent is extended or adjusted under 35 U.S.C. 154(b) by 400 days.

(21) Appl. No.: 18/140,407

(22) Filed: Apr. 27, 2023

(65) Prior Publication Data

US 2023/0406077 A1 Dec. 21, 2023

(30) Foreign Application Priority Data

May 30, 2022 (CN) .......................... 202221332845.7
May 30, 2022 (CN) .......................... 202221344362.9

(51) Int. Cl.
*B60J 10/90* (2016.01)
*B60J 7/16* (2006.01)
*B60J 7/19* (2006.01)

(52) U.S. Cl.
CPC ............. *B60J 7/1607* (2013.01); *B60J 7/194* (2013.01); *B60J 10/90* (2016.02)

(58) Field of Classification Search
CPC . B60J 7/1607; B60J 7/194; B60J 10/90; B60J 7/141; B60J 7/068
USPC ...................................... 296/100.17, 100.09
See application file for complete search history.

(56) References Cited

U.S. PATENT DOCUMENTS

| | | | | |
|---|---|---|---|---|
| 5,460,423 A | * | 10/1995 | Kersting | B60J 7/104 296/100.18 |
| 6,000,744 A | * | 12/1999 | Kooiker | B60J 7/141 296/100.09 |
| 11,273,694 B2 | * | 3/2022 | Facchinello | B60P 7/02 |
| 2011/0101727 A1 | * | 5/2011 | Rusher | B60J 7/141 296/100.18 |
| 2023/0294496 A1 | * | 9/2023 | Dylewski, II | B60J 7/141 296/100.07 |

* cited by examiner

*Primary Examiner* — Roger L Pang
(74) *Attorney, Agent, or Firm* — Quarles & Brady LLP

(57) ABSTRACT

This disclosure provides a supporting structure for laying a cover panel for covering a carriage. The structure includes a first edge member disposed at a side edge of the cover panel configured to be laid flat; a first sealing member disposed partially to a bottom of the first edge member, the first sealing member comprising at least two tight units that are deformable to form a sealing contact with top edge of the carriage; a second edge member disposed to an inner side edge of the carriage, the second edge member comprising a groove on top and a protrusion portion at side towards interior of the carriage; and a second sealing member disposed at the groove to support the first edge member with a tight sealing contact between the first edge member and the second edge member.

20 Claims, 16 Drawing Sheets

ADJUSTABLE SUPPORTING STRUCTURE

The present application claims priority to Chinese Application No. 202221332845.7, entitled "Adjustable Supporting Component", filed May 30, 2022, and Chinese Application No. 202221344362.9, entitled "A Waterproof and Supporting Structure", filed May 30, 2022, which are common own and incorporated by reference herein for all purposes.

BACKGROUND OF THE INVENTION

The present invention relates to the technical field of vehicle carriage equipment, specifically, a waterproof supporting structure with adjustable fixing assembly.

Currently, car models with open carriages require an adjustable cover assembly to protect and cover the cargo inside the carriage. The cover assembly usually includes multiple movable cover panels hinged together that can be folded to open the carriage or deployed flat in a covering state. One of the movable cover panels can be hinged with a flat cover panel that can be fixed to the carriage. One of existing methods to fix the flat cover panel on side frame of the carriage is to use a rotatable handle to set a clamping member to clamp the cover panel onto the frame. This requires precise alignment of the clamping member with the predetermined position of the car, and the cover panel is not easily adjustable relative to the carriage during assembly, making it inconvenient for the operator. At the same time, the cover in the covering state needs to ensure waterproof sealing between the cover panels and the carriage, especially between the cover panels and the sides of the carriage. However, for existing carriage cover assembly the waterproof function is mainly achieved by setting a water guide groove to guide the water away. However, there is still a risk of water leakage in the carriage under heavy rain.

BRIEF SUMMARY OF THE INVENTION

The present invention is directed to an apparatus with an adjustable waterproof supporting structure for a cover of a vehicle carriage or open-type trunk. In a specific embodiment, the supporting structure includes a sealing member disposed between two edge components to improve waterproof sealing of the carriage and includes an adjustable fixing assembly to facilitate fixing at least one cover panel of the cover to the carriage. There are other embodiments as well.

One general aspect of the present disclosure includes a supporting structure for laying a cover panel on a carriage. The supporting structure also includes a first edge member disposed at a side edge of a first cover panel configured to be laid flat to cover the carriage. The structure also includes a first sealing member disposed partially to a bottom part of the first edge member, the first sealing member may include at least two tight units that are deformable to form a sealing contact with top edge of the carriage as the first cover panel is laid flat on the carriage. The structure also includes a second edge member disposed to an inner side edge of the carriage, the second edge member may include a groove on top and a protrusion portion at side towards interior of the carriage. The structure also includes a second sealing member disposed at the groove to support the first edge member with a tight sealing contact between the first edge member and the second edge member.

Implementations may include one or more of the following features. The supporting structure where the at least two tight units of the first sealing member are set with a separation to each other in sequential locations towards interior of the carriage and to be deformed towards exterior of the carriage. The at least two tight units of the first sealing member may include three tight units, the tight unit in a middle one of the sequential locations being shorter than two tight units respectively at outer location and inner location. The supporting structure may include a third sealing member configured to adhesively attach the second edge member to the inner side edge of the carriage. The second edge member may include an extended edge resting on the top edge of the carriage and a first side edge in parallel facing the inner side edge of the carriage, the third sealing member forming tight contact horizontally with the extended edge and vertically with the first side edge. The second sealing member may include a bigger part embedded into the groove of the second edge member and a smaller part with a rounded convex surface that abuts against bottom of the first edge member when the first cover panel is laid flat on the carriage. The first edge member is characterized by a length substantially equal to that of the side edge of the first cover panel of the cover assembly.

Implementations may also include one or more of the following features. The supporting structure may include a first connecting frame attached to the first cover panel along a width direction of the carriage, and a second connecting frame attached to a second cover panel, and a hinge member having two hinge portions at two ends joined by a bending portion in the middle, the two hinge portions being embedded respectively in the first connecting frame and the second connecting frame to connect the second cover panel to the first cover panel, the bending portion being flexible to allow the second cover panel folded towards the first cover panel. The supporting structure may include a stopper disposed at an end of the connecting frame next to the first edge member, the stopper may include a first part located between the connecting frame and the hinge member, a second part located over the first sealing member, and a third part matched with the first edge member, the first part, the second part, and the third part being smoothly sliced with the first edge member and the end of the connecting frame. The stopper is fixed to the connecting frame by a set screw and secured from bottom by an adhesive form.

Implementations may also include one or more of the following features. The supporting structure may include a fixing assembly disposed from bottom of the first cover panel and configured to couple with the protrusion portion of the second edge member and fix the first cover panel at a position along a length direction of the carriage. The fixing assembly may include: a first fixing bracket with a sliding groove attached to the bottom side of the first cover panel and a locking rod movable along the sliding groove in a width direction of the carriage, a second fixing bracket may include a stop portion engaged with the protrusion portion of the second edge member to limit a relative vertical motion and a press portion configured to be pressed against the first fixing bracket, and a fixing setter configured to screw onto the locking rod to press the first fixing bracket against the second fixing bracket. The stop portion may include a seat portion configured to have a matched shape to receive the protrusion portion of the second edge member, the seat portion having two open ends allowing the second fixing bracket to engage with the second edge member by slide-in. The second edge member may include a second side edge opposite to the first side edge that adhesively presses the third sealing member, the second side edge may include a first tooth portion, the second fixing bracket may include a connecting edge joined with the stop portion and the press portion, the connecting edge having a second tooth portion configured to match the first tooth portion to lock the second fixing bracket to the second edge member. The fixing setter may include a tightening device coupled from bottom to the locking rod and a washer set between the tightening device and the press portion of the second fixing bracket.

Another general aspect of the present disclosure includes a supporting structure for laying a cover panel on a carriage. The supporting structure also includes a first edge member disposed at a side edge of a cover panel configured to be laid flat to cover the carriage, the first edge member may include a first groove along a length direction of the carriage. The structure also includes a first sealing member may include a flat portion covering top part of the first edge member, a connection portion embedded to the first groove, and an extended portion having at least two tight units that are deformable to form a sealing contact with top edge of the carriage as the cover panel is laid flat. The structure also includes a second edge member disposed to an inner side edge of the carriage, the second edge member may include a second groove on top and a protrusion portion at side towards interior of the carriage. The structure also includes a second sealing member disposed at the second groove to support the first edge member with a tight sealing contact between the first edge member and the second edge member.

Implementations may include one or more of the following features. The supporting structure where the at least two tight units are set with a separation to each other in sequential locations towards interior of the carriage and to be deformed towards exterior of the carriage as the extended portion being laid down on the carriage by gravity. The second edge member is fixed to the inner side edge of the carriage by rivets. The supporting structure may include a fixing assembly disposed from bottom of the first cover panel and configured to couple with the protrusion portion of the second edge member and fix the first cover panel at a position along a length direction of the carriage. The fixing assembly may include: a first fixing bracket with a sliding groove attached to the bottom side of the first cover panel and a locking rod movable along the sliding groove in a width direction of the carriage, a second fixing bracket may include a stop portion engaged with the protrusion portion of the second edge member to limit a relative vertical motion and a press portion configured to be pressed against the first fixing bracket, and a fixing setter configured to screw onto the locking rod to press the first fixing bracket against the second fixing bracket.

It is to be appreciated that embodiments of the present invention provide many advantages over conventional techniques. Among other things, the supporting structure includes a combination of a first edge member and a first sealing member forming a first seal between the cover panel and the carriage. By setting a second edge member on the inner side edge of the carriage and a second sealing member on top part of the second edge member, a second seal is formed between the second edge member and the first edge member. By setting a third sealing member between the second edge member and inner side edge of the carriage, the waterproof sealing between the second edge member and the carriage is also achieved. This ensures that the first edge member, the second edge member, and the carriage body all have a sealing structure between them, greatly ensuring the waterproof sealing performance of the carriage interior, Additionally, the second edge member is fixedly connected to the inner side edge of the carriage. A second fixing bracket is restricted from vertically moving by cooperating with the protruding portion and tooth contours of the second edge member. Meanwhile, the second fixing bracket is allowed to flexibly slide along the length direction of the carriage. Moreover, the second fixing bracket is clamped onto a first fixing bracket by a fixing setter, while the vertical limitation of the second fixing bracket and the second edge member ensures the adjustable position fixation of the first fixing bracket, the second fixing bracket, and the cover panel, making the entire assembly process of laying multiple cover panels on the carriage more convenient with easy alignment.

The present invention achieves these benefits and others in the context of known technology. However, a further understanding of the nature and advantages of the present invention may be realized by reference to the latter portions of the specification and attached drawings.

NUMERICAL INDICATORS FOR COMPONENTS IN FIGURES ABOVE

Figure 1:
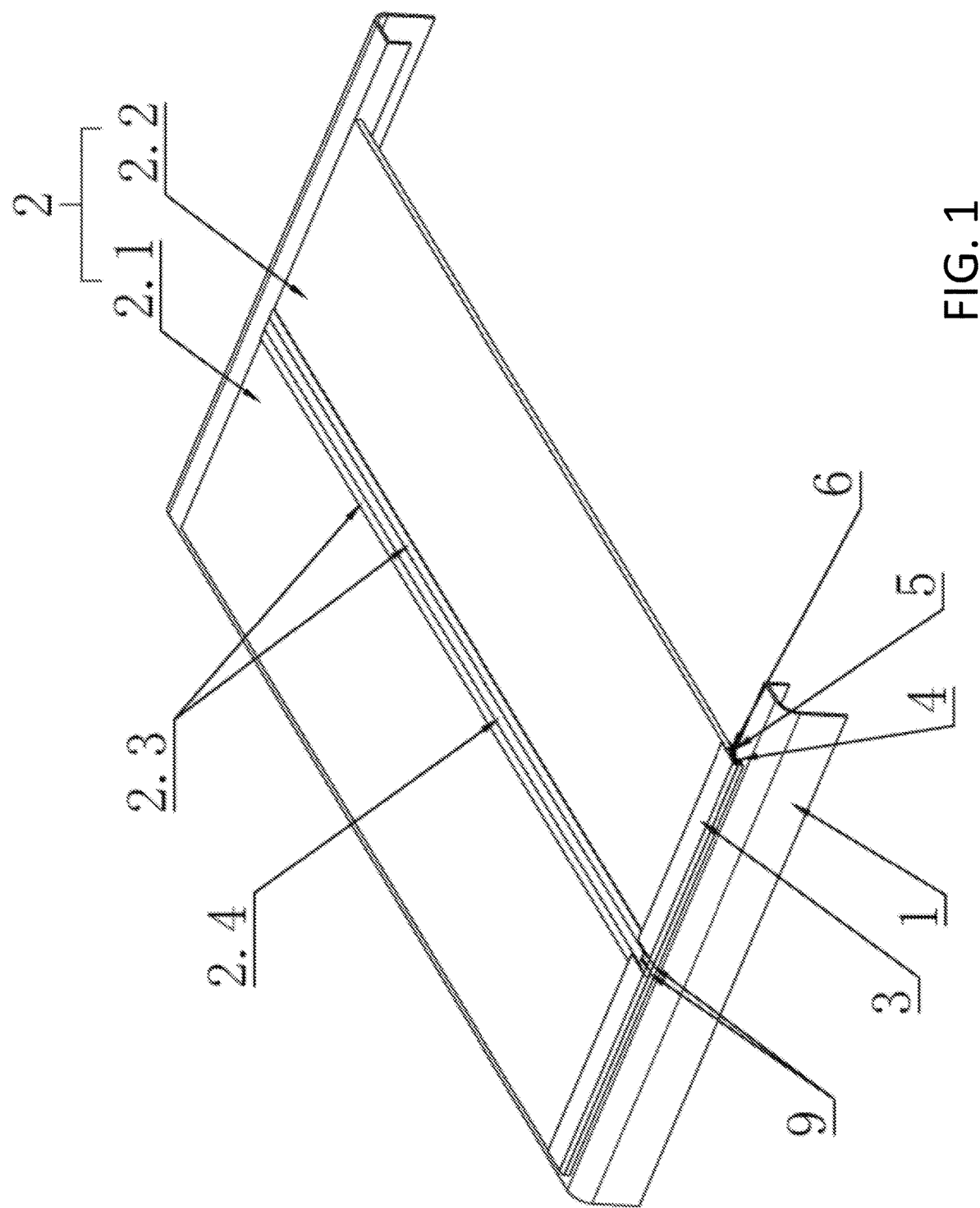
FIG. 1 is a perspective top view of an overall structure of a cover assembly for covering a vehicle carriage according to an embodiment of the present invention.

1: Carriage body; 2: Cover assembly; 2.1: Fixed cover panel, 2.2: Movable cover panel, 2.3: Connecting frame, 2.31: Protruding portion, 2.32: Hole; 2.4: Hinge member; 2.41: Hinge portion; 2.42: Bending portion; 2.43: V-shaped notch; 2.44: Arc-shaped notch.

3: First edge member; 3.1: Step portion; 3.2: Convex portion.

4: First sealing member; 4.1: First tight unit.

5: Second edge member; 5.1: Extended edge; 5.2: First groove; 5.3: Protrusion portion; 5.4: First tooth portion.

6: Second sealing member; 6.2: Bigger end, 6.3: Smaller end.

7: Sealed space; 8: Third sealing member; 9: Stopper; 9.1: First portion; 9.2: Second portion; 9.3: Third portion; 10: Set screw; 11: Adhesive foam.

12: First fixing bracket; 12.1: Second groove.

13: Locking rod; 13.1: Slider.

14: Second fixing bracket; 14.1: Stop portion; 14.11: Seat portion; 14.12: Second tooth portion; 14.2: Press portion; 14.21: Strip hole; 14.3: Connecting edge.

15: Fixing setter; 15.1; Tightening device; 15.2: Washer; 16: Rivet.

17: Third edge member; 17.1: Third groove; 17.2: Support portion.

18: Fourth sealing member; 18.1: Connection portion; 18.2: Extended portion; 18.3: Second tight unit; 18.4: Flat portion.

DETAILED DESCRIPTION OF THE INVENTION

The present invention is directed to an apparatus with an adjustable waterproof supporting structure for a cover of a vehicle carriage or open-type trunk. In a specific embodiment, the supporting structure includes a sealing member disposed between two edge components to improve waterproof sealing of the carriage and includes an adjustable fixing assembly to facilitate fixing at least one cover panel of the cover to the carriage. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented with references to the drawings, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, side, one end, upper, middle, lower, close, near, away, forward, reverse, clockwise and counterclockwise have been used for convenience purposes only and are not intended to imply any particular fixed direction. Instead, they are used to reflect relative locations and/or directions between various portions of an object. These terms are only used to distinguish the components from each other for better understanding, rather than defining any directional or sequential limitations.

As shown in FIGS. 1-7, a cover supporting structure is provided to support a cover assembly 2 overlaid on a vehicle carriage body 1. FIG. 1 is a perspective top view of an overall structure of a cover assembly for covering a vehicle carriage according to an embodiment of the present invention. This diagram is merely an example, which should not unduly limit the scope of the claims. One of ordinary skill in the art would recognize many variations, alternatives, and modifications. In a specific embodiment, the carriage body 1 as shown is a frame structure mountable to side rms along the length direction of the carriage. The cover assembly 2 includes at least two cover panels hinge-coupled to each other. One cover panel 2.1 may be laid flat in a covering state to cover the carriage and adjustably fixed to the carriage body 1. Another cover panel 2.2 may be movable and folded via the hinge or also deployed flat (as shown) in the covering state. The cover panels, for example, each being made by an aluminum plate, can be arranged by a frame around edges.

Figure 2:
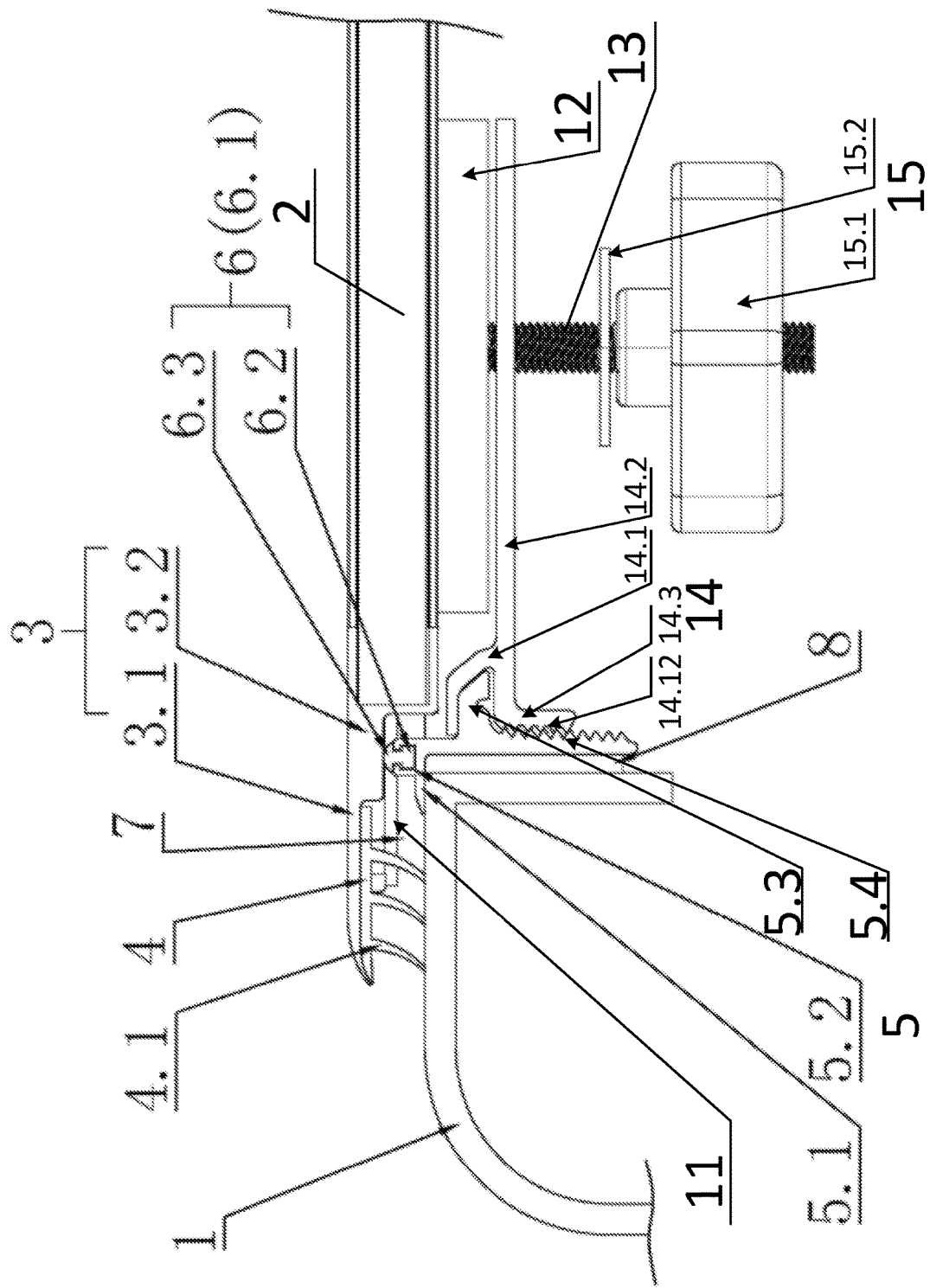
FIG. 2 is a side view of a waterproof supporting and fixing structure of the cover assembly of FIG. 1 according to the embodiment of the present invention.

FIG. 2 is a side view of a cover supporting structure in FIG. 1 according to the embodiment of the present invention. This diagram is merely an example, which should not unduly limit the scope of the claims. One of ordinary skill in the art would recognize many variations, alternatives, and modifications. As shown in FIG. 2, a first edge member 3 is provided along the length direction of the carriage as a frame arranged on one side edge of the cover assembly 2. The figure shows that the cover panel of the cover assembly 2 is laid flat by resting its side edge on top edge of the carriage body 1. The first edge member 3 is pressed against the cover panel side edge, leaving a small cavity region between itself and the top edge of the carriage body 1. A first sealing member 4 is also disposed along the length direction of the carriage. The first sealing member 4, for example, a synthetic rubber material, includes a flat portion that is provided at the bottom part of the first edge member 3. The flat portion of the first sealing member 4 naturally connects to one or more first tight unit 4.1 in a tilted angle leaning towards interior of the carriage. The one or more first tight units 4.1 have a length greater than the height of the cavity region. When first sealing member 4 is in position with the one or more first tight units 4.1 being pressed between the carriage body 1 and the first edge member 3, thereby forming a first seal structure including a sealed space 7 between the cover assembly 2 and the vehicle carriage.

A second edge member 5 is provided along the length direction from the inner side edge of the vehicle carriage body 1. Specifically, the second edge member 5 includes an extended edge 5.1 supported by a vertical portion of the carriage body 1 and a first groove 5.2 located at top part of the second edge member 5. A second sealing member 6 is disposed along the length direction of the carriage. The second sealing member 6 includes a bigger end 6.2 configured to engage with the first groove 5.2 on the second edge member 5, and a smaller end 6.3 located above the bigger end 6.2. The smaller end 6.3 of the second sealing member 6 provides natural support when the second sealing member 6 is pressed between the first edge member 3 and the second edge member 5. The second sealing member 6, optionally made by a synthetic rubber material, is squeezed by the second edge member 5 and tightly abuts between the first edge member 3 and the second edge member 5, thereby forming a second seal structure between the second edge member 5 and the first edge member 3.

A third sealing member 8, for example a form-like material in a flat shape, is provided along the length direction of the carriage between the inner side surface of the vehicle carriage body 1 and a smooth side surface of the second edge member 5 and to achieve sealing between the second edge member 5 and the carriage, thereby forming a third seal structure. Between the first sealing member 4 and the second sealing member 6 and between second sealing member 6 and the third sealing member 8, a sealed space 7 is formed, which is located outside of the carriage space. In the embodiment, the first sealing member 4, the second sealing member 6, and the third sealing member 8 together form a sealing assembly in the cover supporting structure combined with the first edge member 3, second edge member 5, and the carriage body 1. The sealing assembly ensures that the first edge member 3, the second edge member 5, and the vehicle carriage body 1 all have a sealing structure with respect to each other. This greatly guarantees the waterproof sealing of the interior of the vehicle carriage. The tight unit 4.1 of the first sealing member 4 is deformed and pressed by the top part of the vehicle carriage body 1, the smaller part 6.3 of the second sealing member 6 is deformed and pressed by the bottom part of the first edge member 3, and the third sealing member 8 is pressed by the second edge member 5 to the inner side edge of the carriage body 1, so that the entire sealing assembly has deformation in the vertical upward, vertical downward, and horizontal directions, ensuring force balance and waterproof.

Optionally, the first sealing member 4 includes multiple tight units 4.1 with regular intervals. Each tight unit 4.1 is connected to the flat portion of the first sealing member 4. The multiple tight units 4.1 are oriented towards inner side of the cavity region between the first edge member 3 and the carriage body 1. When the first sealing member 4 is pressed by the first edge member 3 from atop, the multiple tight units 4.1 are preset with a tendency to deform towards the outer side of the carriage body 1, ensuring that each of the tight unit to play a waterproof role.

In a specific embodiment, the multiple tight units 4.1 have at least three units, with each two units forming a sub-sealed space to isolate external water ingress. Each tight unit is curved to provide a tendency for deformation towards the outer side. When the cover assembly 2 is in the covering state, the curved shape can be compressed and extended towards the outer side of the carriage body 1. The outer edge of each curved tight unit forms a water-blocking boundary to ensure the flatness of the first sealing member 4. Optionally, the central unit is shorter than the two other units to avoid mutual compression between neighboring units and to maintain waterproofness.

Referring to FIG. 2 again, the first edge member 3 includes an inner-concaved step portion 3.1 corresponding to the first sealing member 4. While, the first edge member 3 includes a convex portion 3.2 corresponding to the second sealing member 6. When the cover assembly 2 is laid flat in the covering state, the first sealing member 4 is pressed by the step portion 3.1 of the first edge member 3 and the second sealing member 6 is pressed by the convex portion 3.2 of the first edge member 3. The compressed thickness of the first sealing member 4 and the second sealing member 6 can match each other to ensure the flatness of the cover assembly 2.

Referring to FIG. 2 again, the second edge member 5 is provided with a T-shaped first groove 5.2 along the length direction of the carriage body 1. In an embodiment, the second sealing member 6 has a bigger end 6.2 embedded in the first groove 5.2 and a smaller end 6.3 protruding from the first groove 5.2. The smaller end 6.3 has a rounded convex surface that abuts against the bottom of the first edge member 3. The small end 6.3 is deformed by compression and extended laterally to the upper surface of the first groove 5.2, so as to have a flattened attachment to the convex portion 3.2 and support the first edge member 3.

The third sealing member 8, for example, can be made by the foam material, which is adhered between the second edge member 5 and inner side of the carriage body 1. Optionally, the second edge member 5 is fixed to the inner side of the carriage body 1 by adhesive foam. Specifically, the upper end of the second edge member 5 is provided with an extended edge 5.1 on the top edge of the carriage body 1. The third sealing member 8 abuts between a horizontal boundary set by the extended edge 5.1 and a first vertical boundary set by the second edge member 5. On a second vertical boundary of the second edge member 5, which is opposite to the first vertical boundary, a (second) fixing bracket 14 is disposed towards interior of the carriage. Fixing bracket 14 is part of a fixing assembly and configured to press the second edge member 5 against the second vertical boundary to improve the stability of the second edge member 5 and the sealing effect of the third sealing member 8.

Optionally, the second sealing member 6 and the third sealing member 8 are aligned in vertical direction.

Figure 3:
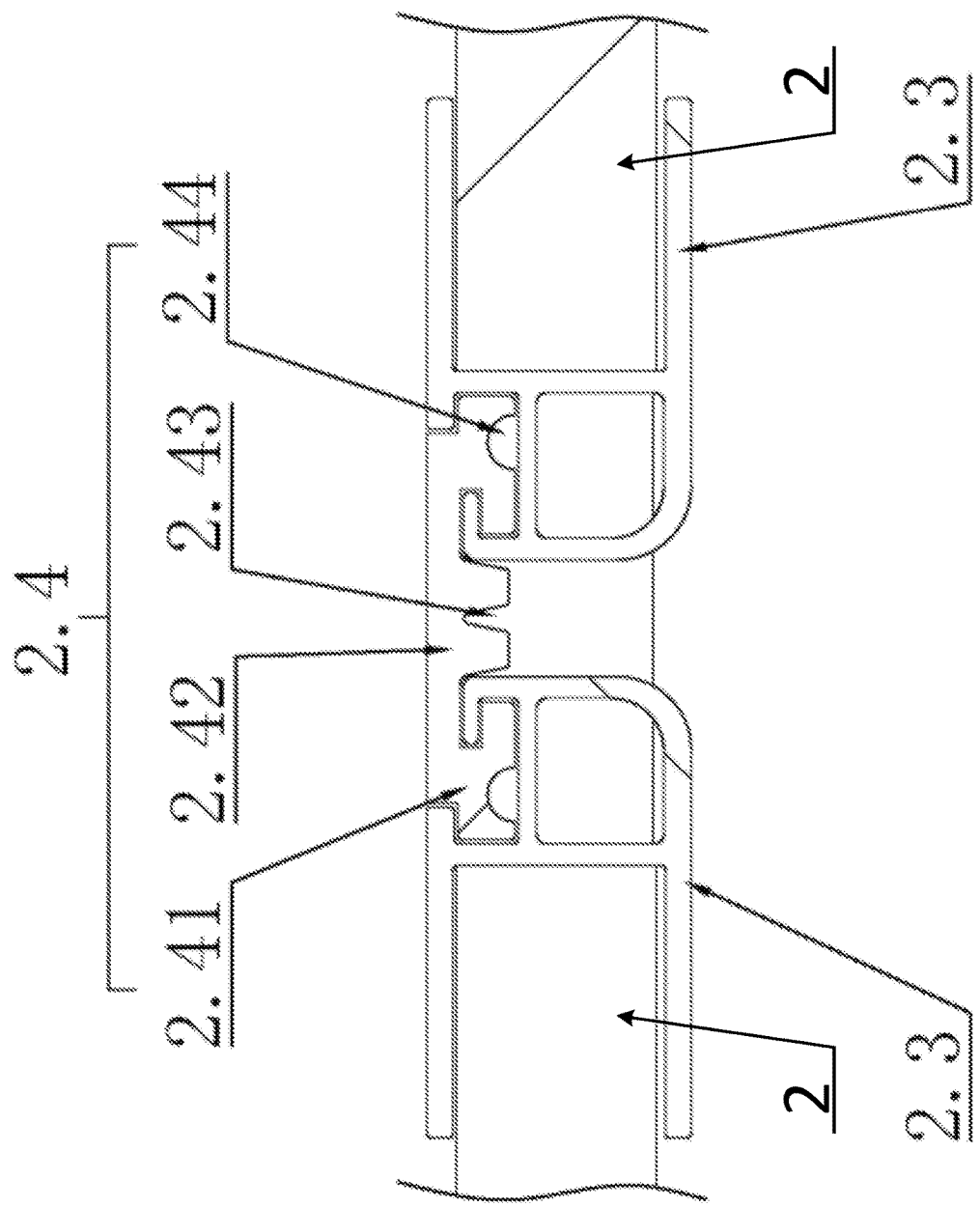
FIG. 3 is a cross-sectional view of a hinge structure of the cover assembly of FIG. 1 according to the embodiment of the present invention.

FIG. 3 is a cross-sectional view of a hinge structure of the cover assembly of FIG. 1 according to the embodiment of the present invention. This diagram is merely an example, which should not unduly limit the scope of the claims. One of ordinary skill in the art would recognize many variations, alternatives, and modifications. As shown in FIG. 3, in another embodiment, the cover assembly 2 includes a fixed cover panel 2.1 and a movable cover panel 2.2 hinged on the fixed cover panel 2.1. A pair of connecting frames 2.3 are provided between the fixed cover panel 2.1 and the movable cover panel 2.2. Each connecting frame 2.3 has a framing side holding the side-end of a cover panel and a connecting side (opposite to the framing side) with a connecting groove used for connecting the other connecting frame 2.3 with the same configuration. A hinge member 2.4 is provided between the two connecting sides to complete the connection. The hinge member 2.4, being made by a flexible material, includes a hinge portion 2.41 at each end and a bending portion 2.42 in the middle. The hinge portion 2.41 at one end is embedded in the connecting groove of a first connecting frame 2.3 and the hinge portion at another end is embedded in the connecting groove of a second connecting frame 2.3 to make the connection with a tightly sealing. A V-shaped notch 2.43 is formed in the middle of the bending portion 2.42, which allows the hinge member 2.4 to bend and deform through the V-shaped notch 2.43 when the movable cover plate 2.2 is folded.

Specifically, the bottom of the hinge portion 2.41 is provided with an arc-shaped notch 2.44, which tends to expand the hinge portion 2.41 towards both sides in the connecting groove of the connecting frame 2.3, thereby further improving the sealing effect around the connection region between two cover panels of the cover assembly 2.

Figure 4:
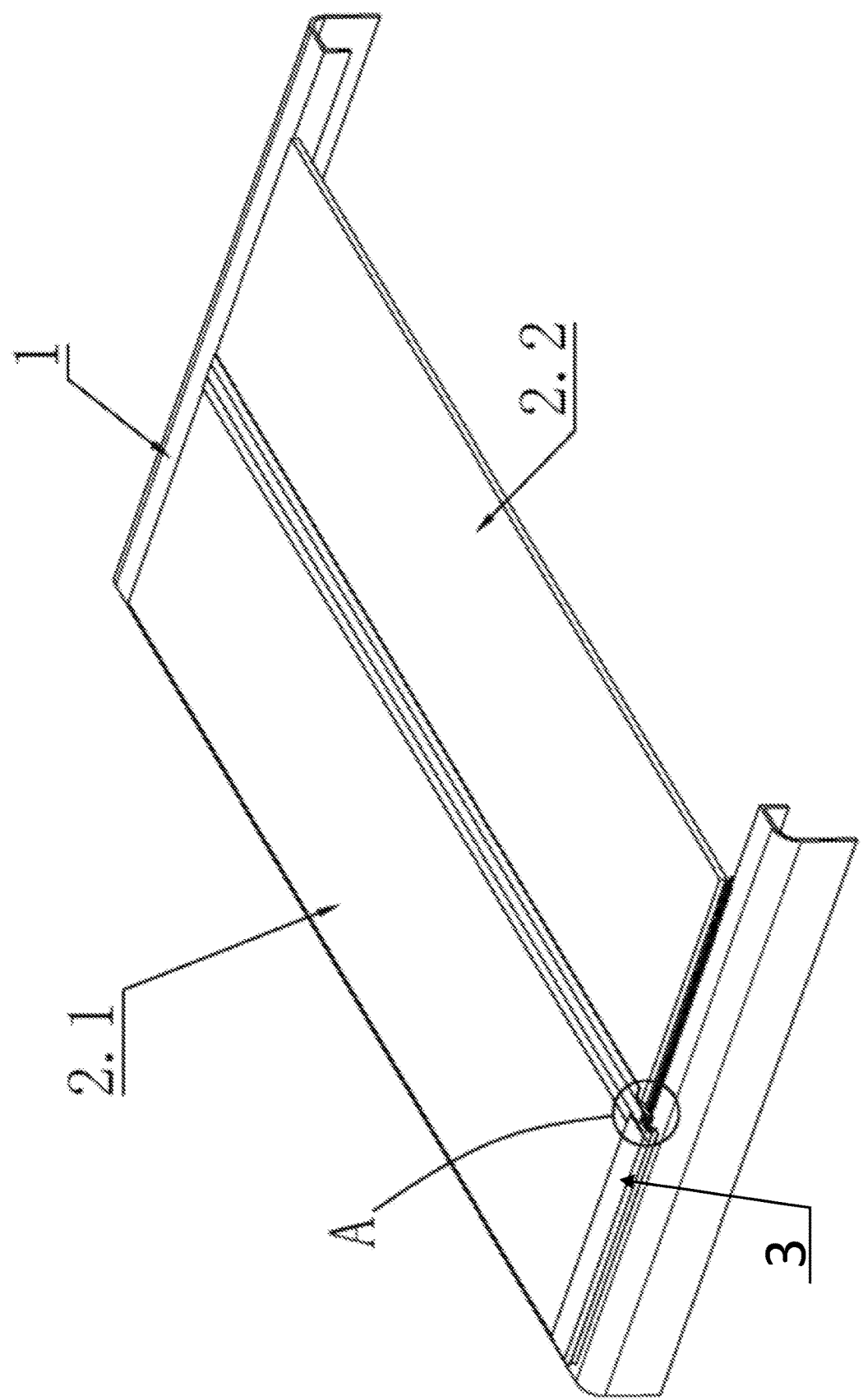
FIG. 4 is a perspective view of the cover assembly with some edge components being removed according to the embodiment of the present invention.

FIG. 4 is a perspective view of the cover assembly with some edge components being removed according to the embodiment of the present invention. This diagram is merely an example, which should not unduly limit the scope of the claims. One of ordinary skill in the art would recognize many variations, alternatives, and modifications. As shown, the cover assembly (also see FIG. 1) includes two cover panels disposed in the covering state on the carriage body 1, a first cover panel 2.1 is a fixed cover panel that may be always laid flat and a second cover panel 2.2 is a movable cover panel that can be folded upward. On one side region of the first cover panel 2.1, the first edge member 3 is still disposed along the length direction of the carriage as shown in FIGS. 1-2. The first edge member 3 has a length that is substantially equal to the length of the side edge of the cover panel. On the side region of the second cover panel 2.2, a corresponding first edge member 3 has been removed so that the second cover panel 2.2 can be folded upwards and forward to the direction of the first cover panel 2.1. Region A of FIG. 4 is a junction region between two first edge members 3 respectively associated with the first cover panel 2.1 and the second cover panel 2.2. The detailed structure of the region A will be shown below.

Figure 5:
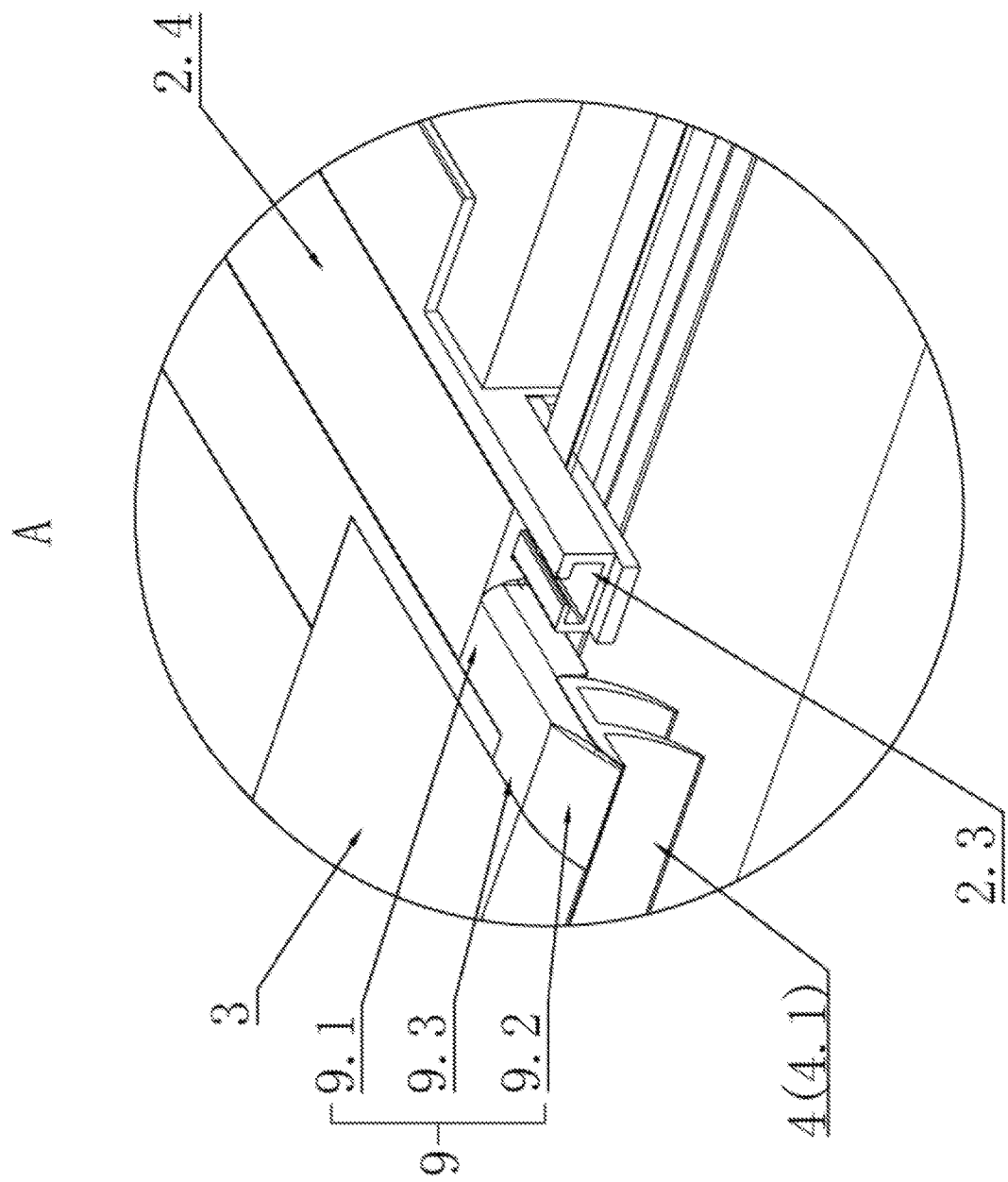
FIG. 5 is an enlarged view of region A of FIG. 4 according to the embodiment of the present invention.
Figure 6:
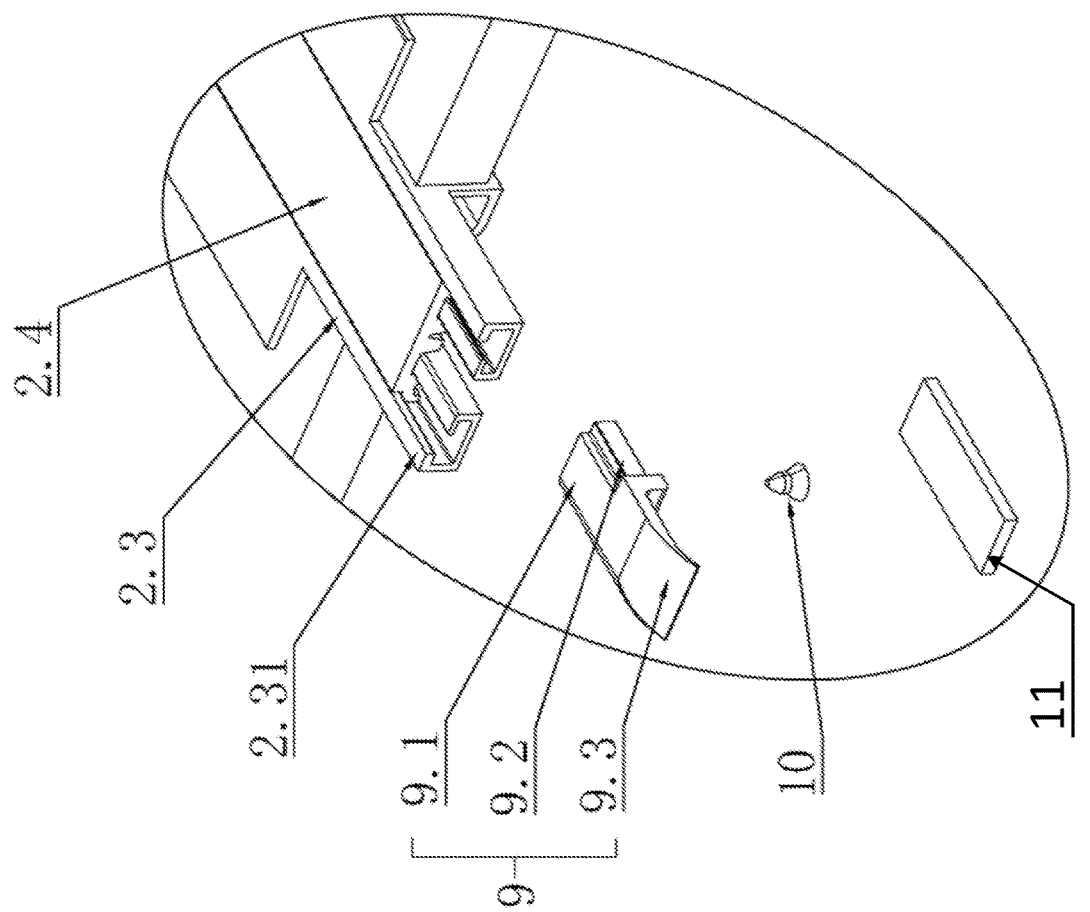
FIG. 6 is an exploded view of part of region A of FIG. 4 with a stopper and a mounting screw according to the embodiment of the present invention.
Figure 7:
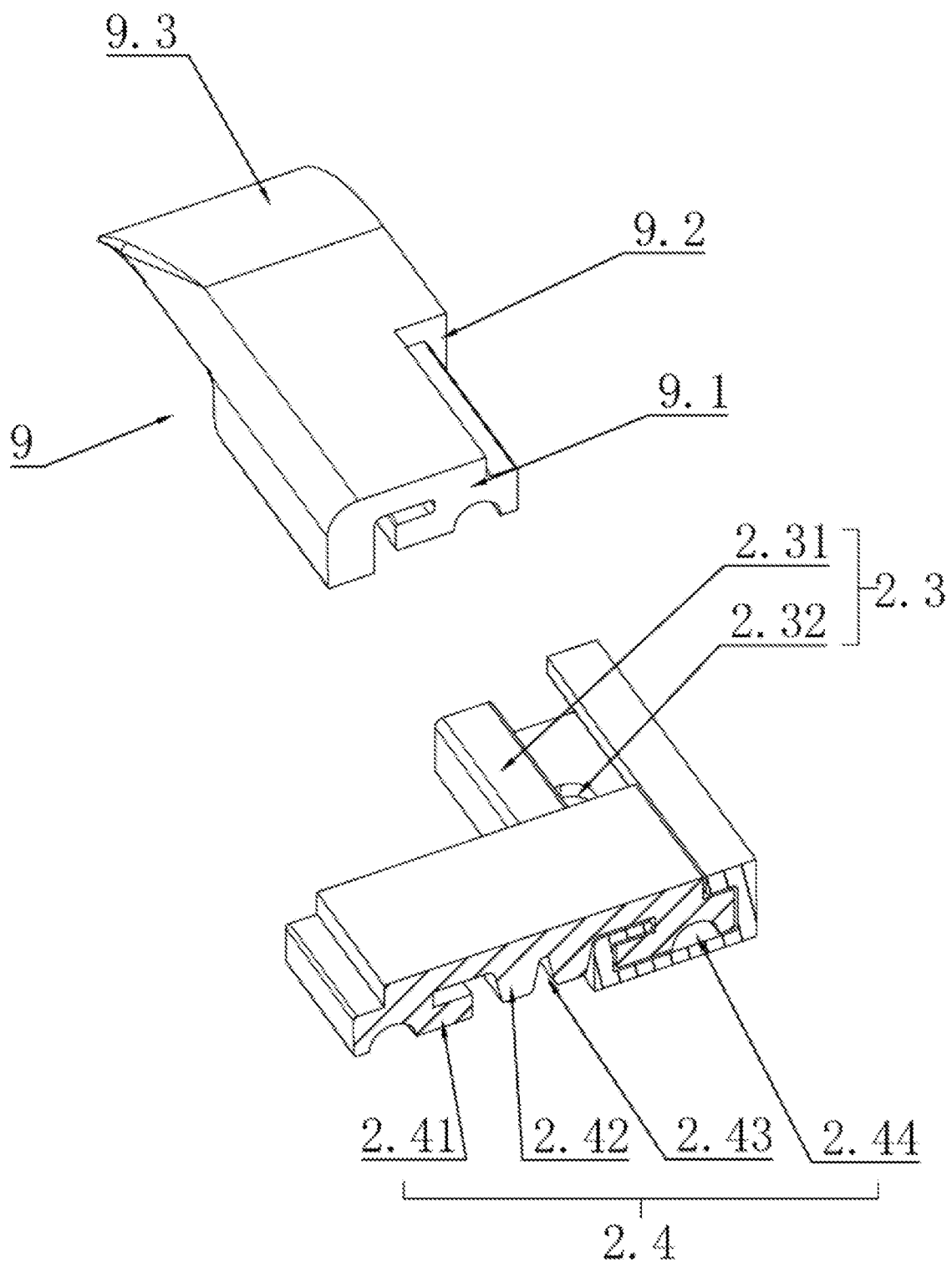
FIG. 7 is an exploded view of the stopper from another angle according to the embodiment of the present invention.

FIG. 5 is an enlarged view of region A of FIG. 4 according to the embodiment of the present invention. FIG. 6 is an exploded view of part of region A of FIG. 4 with a stopper and a mounting screw according to the embodiment of the present invention. FIG. 7 is an exploded view of the stopper from another angle according to the embodiment of the present invention. These diagrams are merely examples, which should not unduly limit the scope of the claims. One of ordinary skill in the art would recognize many variations, alternatives, and modifications. As shown in FIG. 5, the detailed structure of the region A includes an end structure of the connecting frame 2.3. Particularly, the first edge member 3 for the second cover panel (2.2) has been removed, compared with the first edge member 3 for the first cover panel (2.1) that is remained in position as shown. Additionally, a stopper 9 corresponding to the second cover panel (2.2) also has been removed to reveal a protruding portion 2.31 of the connecting frame 2.3, compared with the stopper 9 corresponding to the first cover panel (2.1) that is remained in position of the protruding portion as shown.

As shown in FIG. 6, the protruding portion 2.31 of the connecting frame 2.3 extends along the width direction of the carriage body 1 and is flush with the first edge member 3. The stopper 9 is provided at the protruding portion 2.31 of the connecting frame 2.3. The stopper 9 has a first portion 9.1 that seals the connecting portion between the connecting frame 2.3 and the hinge member 2.4, a second portion 9.2 that covers (partially) the first sealing member 4, and a third portion 9.3 that matches the first edge member 3 in shape. The first portion 9.1 is inserted into the connecting groove of connecting frame 2.3 and matches the connecting portion of the hinge member 2.4. The bottom contour of the second portion 9.2 matches the upper contour of the first sealing member 4. The third portion 9.3 is spliced between the first edge member 3 and the boundary of the connecting frame 2.3, making the first portion 9.1, the second portion 9.2, and the third portion 9.3 smoothly connect to the first edge member 3 and the connecting frame 2.3, so that the surface of the stopper 9, the connecting frame 2.3, the hinge member 2.4, and the first edge member 3 are flush, thus improving the integrity.

In addition, as shown in FIG. 7, a hole 2.32 is provided at the extending portion 2.31 of connecting frame 2.3. The first portion 9.1 of stopper 9 is fixed to the connecting frame 2.3 by a set screw 10 through the hole 2.32. Also seen in FIG. 2, the bottom surface of stopper 9 can be partially fixed to the connecting frame 2.3 by an adhesive foam 11, which is also pressed on the surface of the screw 10. Furthermore, smaller end 6.3 of the second sealing strip 6, deformed to an extended flat state, can be in contact with the foam 11.

In the embodiment, the multiple cover panels of the cover assembly 2 have their side edges being sealed by using multiple separate first edge member 3. Stopper 9 is designed and used to seal gaps between two first edge member 3 and connect the boundaries of the connecting frame 2.3, the first edge member 3, and the hinge member 2.4. Further, the stopper 9 provides improved integrity and waterproof performance of the movable cover panel 2.2 as well as the fixed cover panel 2.1.

Figure 8:
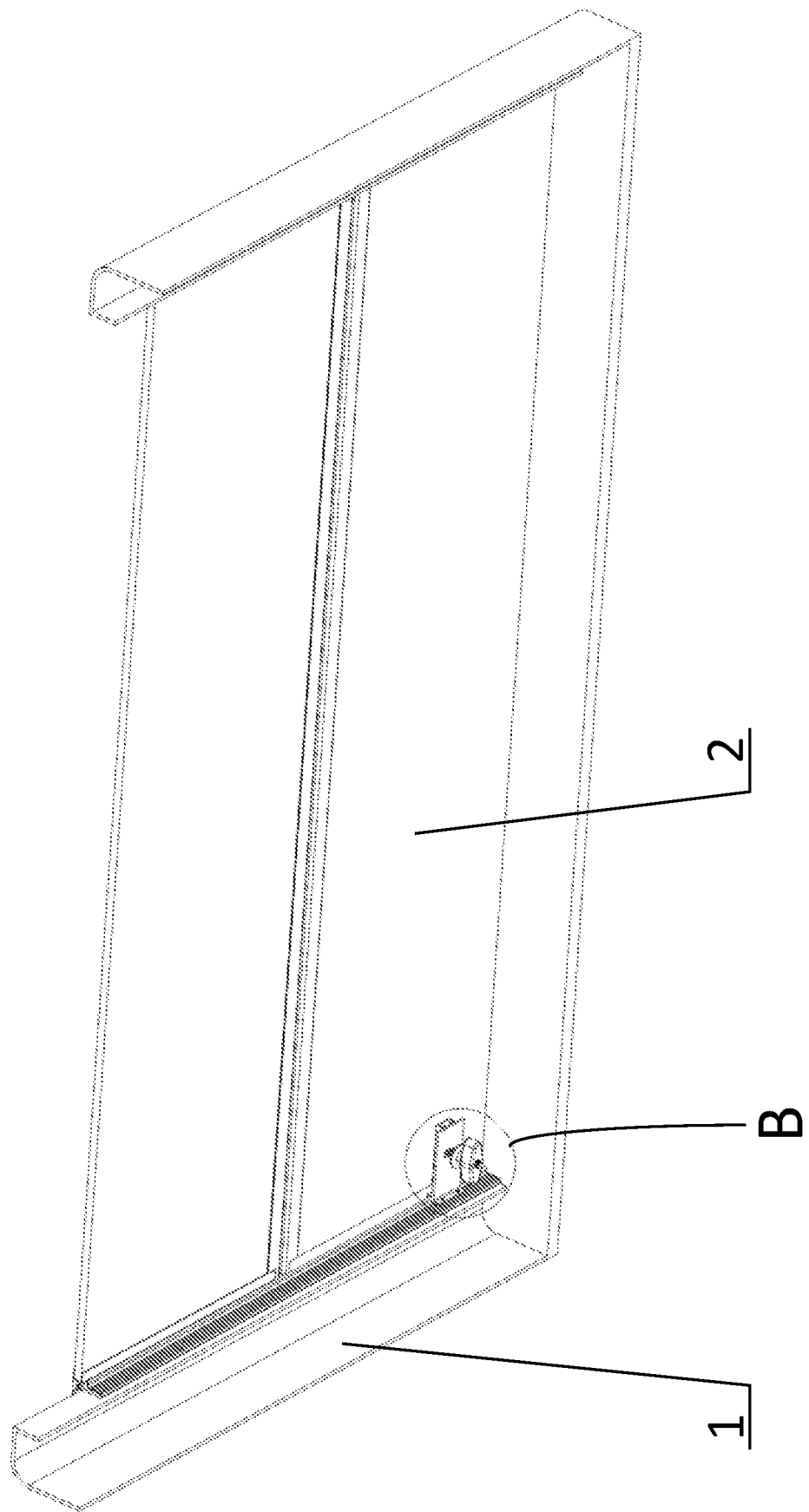
FIG. 8 is a perspective bottom view of the cover assembly with a fixing assembly according to another embodiment of the present invention.
Figure 9:
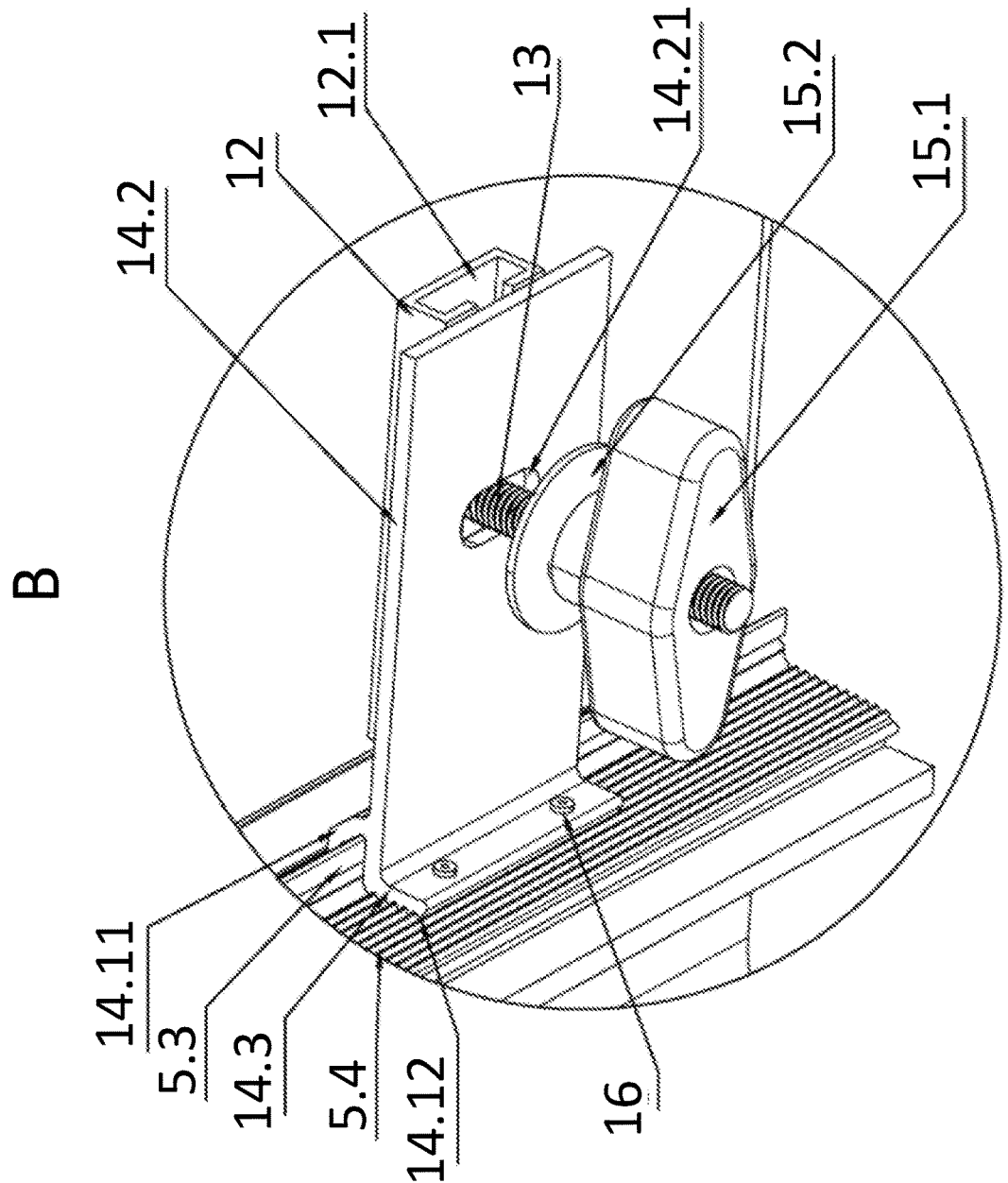
FIG. 9 is an enlarged view of region B of FIG. 8 according to the embodiment of the present invention.

FIG. 8 is a perspective bottom view of the cover assembly with a fixing assembly according to another embodiment of the present invention. Additionally, FIG. 9 is an enlarged view of region B of FIG. 8 according to the embodiment of the present invention. These diagrams are merely examples, which should not unduly limit the scope of the claims. One of ordinary skill in the art would recognize many variations, alternatives, and modifications. In another embodiment, the fixing assembly includes at least a first fixing bracket 12 for fixing to the first cover panel 2.1 and a second fixing bracket 14 for fixing to the second edge member 5. FIG. 2 shows a side view of the fixing assembly. The first fixing bracket 12 of the fixing assembly is disposed at the bottom of the cover panel and fixed by a fixing setter 15 using a tightening device 15.1 to drive a locking rod 13. FIG. 2 also shows that the second edge member 5 has a first tooth portion 5.4 located at opposite side of the smooth surface for pressing the third sealing member 8 and a protrusion portion 5.3 protruded towards interior of the carriage. The second fixing bracket 14 of the fixing assembly includes a stop portion 14.1 having a seat portion 14.11 to hold and stop the protrusion portion 5.3 of the second edge member 5 from moving towards interior of carriage. At the same time, the second fixing bracket 14 includes a second tooth portion 14.12 on a connecting edge 14.3 that engages with the first tooth portion 5.4 to lock the second fixing bracket 14 to the second edge member 5.

Referring to FIG. 9, more features of the fixing assembly are shown. The second fixing bracket 14, including stop portion 14.1 engaged with the protrusion portion 5.3 of second edge member 5, and a press portion 14.2 that matches with the first fixing bracket 12. The stop portion 14.1 uses the second tooth portion 14.12 to engage with the contour of first tooth portion 5.4 of the second edge member 5 to limit the vertical movement of the second fixing bracket 14. The press portion 14.2 is also provided with a strip hole 14.21 for the locking rod 13 to pass through. The locking rod 13 is driven by the tightening device 15.1 to press first fixing bracket 12 and second fixing bracket 14 together to a bottom position of a fixed cover panel of the cover assembly 2 (see FIG. 2 and FIG. 8).

Fixing setter 15, which is screwed onto the locking rod 13 after passing through the strip hole 14.21 to press the first fixing bracket 12 on the second fixing bracket 14, thereby fixing the position of the fixed cover panel of the cover assembly 2.

In an embodiment, the second edge member 5 is fixed to the inner side of the carriage body 1 by adhesive foam. In another embodiment, the second edge member 5 is fixedly connected to the carriage body 1 by rivets 8 to further increase the stability of the second fixing bracket 14 and ensure the stability of the fixed cover panel of the cover assembly 2.

Referring further to FIG. 2, the second edge member 5 has the protruding portion 5.3 extending inwardly along the width direction of the carriage body 1. The stop portion 14.1 of the second fixing bracket 14 is provided with a seat portion 14.11 for receiving the protruding portion 5.3 to engage the two pieces together. The receiving seat portion 14.11 is open at both ends to allow the second fixing bracket 14 to slide into the side frame 5 along the length direction of the carriage body 1. The protruding portion 5.3 engages with the receiving seat portion 14.11 to limit a vertical position of the second fixing bracket 14 with respect to the second edge member 5. Optionally, the mating boundary of the protrusion portion 5.3 and the seat portion 14.11 is trapezoidal to increase the mating area between the stop portion 14.1 and the second edge member 5.

In the embodiment, the second edge member 5 has a first tooth portion 5.4 arranged vertically along the surface at opposite side of the smooth surface for pressing the third sealing member 8. The second fixing bracket 14 has a connecting edge 14.3 with second tooth portions 14.12 matching with the first tooth portion 5.4, so that the second fixing bracket 14 is vertically limited with the second edge member 5 by engaging the first and second tooth portions 5.4 and 14.12. Specifically, the connecting edge 14.3 of second fixing bracket 14 is vertically extended at the bottom of the seat portion 14.11 and the press portion 14.2. The connecting edge 14.3, seat portion 14.11, and press portion 14.2 share the same boundary, and the second tooth portion 14.12 is located on the connecting edge 14.3.

In this embodiment, the second edge member 5 is fixedly connected, for example, attached by an adhesive form, to the inner side of the carriage body 1, and the second fixing bracket 14 is limited in its vertical movement on the second edge member 5 by cooperating with the protrusion portion 5.3 and tooth profile of the second edge member 5. At the same time, the open ends of the seat portion 14.11 enable the second fixing bracket 14 to slide along the length direction of the carriage body 1. The second fixing bracket 14 also has a strip hole 14.21 (see FIG. 9) which also facilitates the alignment of the locking rod 13 with the second fixing bracket 14 for forming the fixing assembly to fix position of the fixed cover panel 2.

Figure 10:
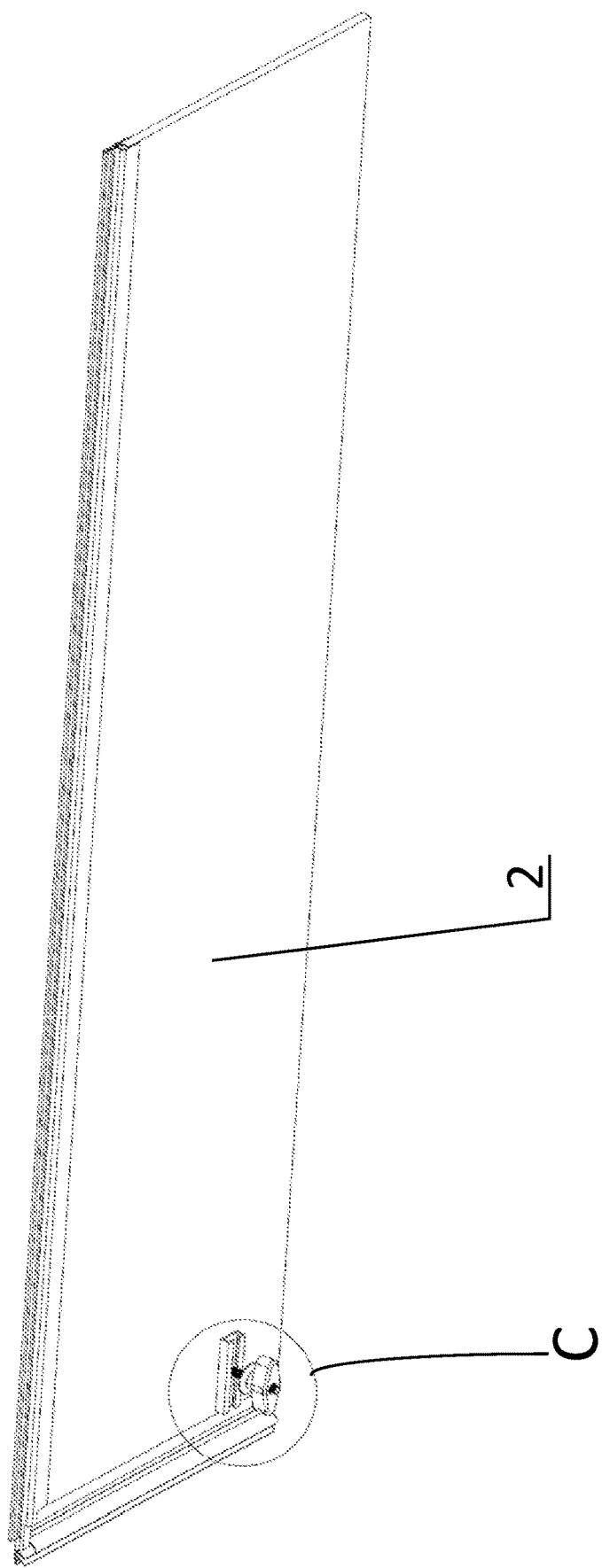
FIG. 10 is a perspective bottom view of the cover assembly with a fixing assembly according to yet another embodiment of the present invention.

FIG. 10 is a perspective bottom view of the cover assembly with a fixing assembly according to yet another embodiment of the present invention. For better illustration purpose, FIG. 11 also shows an exploded view of region C in FIG. 10 according to the embodiment of the present invention. These diagrams are merely examples, which should not unduly limit the scope of the claims. One of ordinary skill in the art would recognize many variations, alternatives, and modifications.

As shown in FIG. 10, a cover panel that is in a flat covering state is fixed in its current position to a side frame of carriage body by a fixing assembly disposed in region C from the bottom side the cover panel 2.

Figure 11:
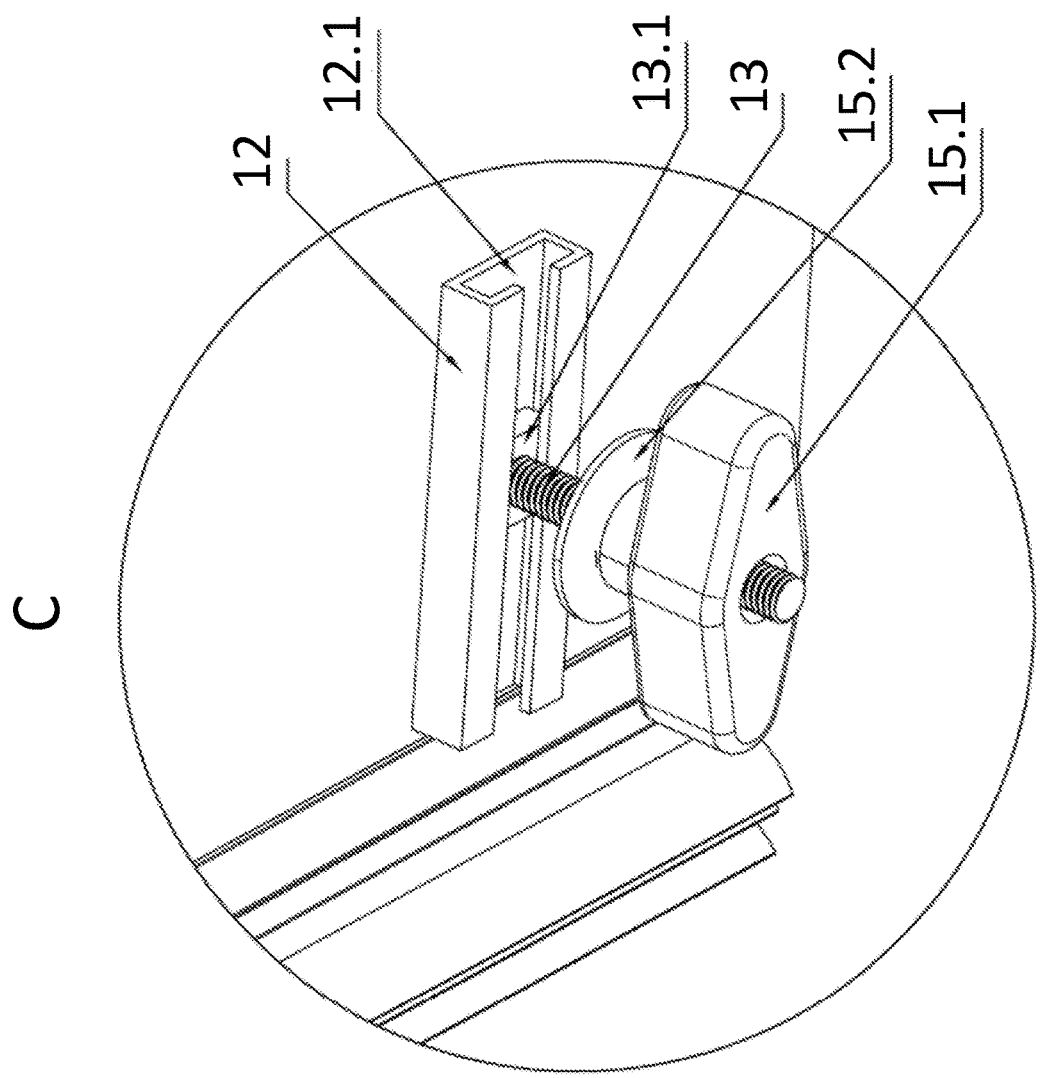
FIG. 11 is an exploded view of region C in FIG. 10 according to the embodiment of the present invention.

In a specific embodiment, as shown in FIG. 11, the fixing assembly in region C of FIG. 10 includes a first fixing bracket 12 with a sliding second groove 12.1. The fixing assembly also includes a locking rod 13 having an end configured as a slider 13.1. The slider 13.1 is slide along the sliding second groove 12.1 to adjust its relative position.

In the embodiment, the fixing assembly further includes a fixing setter 15.1 and a washer 15.2. The fixing setter 15 includes a tightening device 15.1 screwed onto the lower end of the locking rod 13. The fixing setter also includes a washer 15.2 arranged between the tightening device 15.1 and the press portion 14.2, which allows the second fixing bracket 14 to be tightened onto the first fixing bracket 12 by driving the tightening device 15.1. Once the washer 15.2 is pressed to the bottom side of the first fixing bracket 12 the top side of the first fixing bracket 12 is pressed to the bottom of the cover panel.

Figure 12:
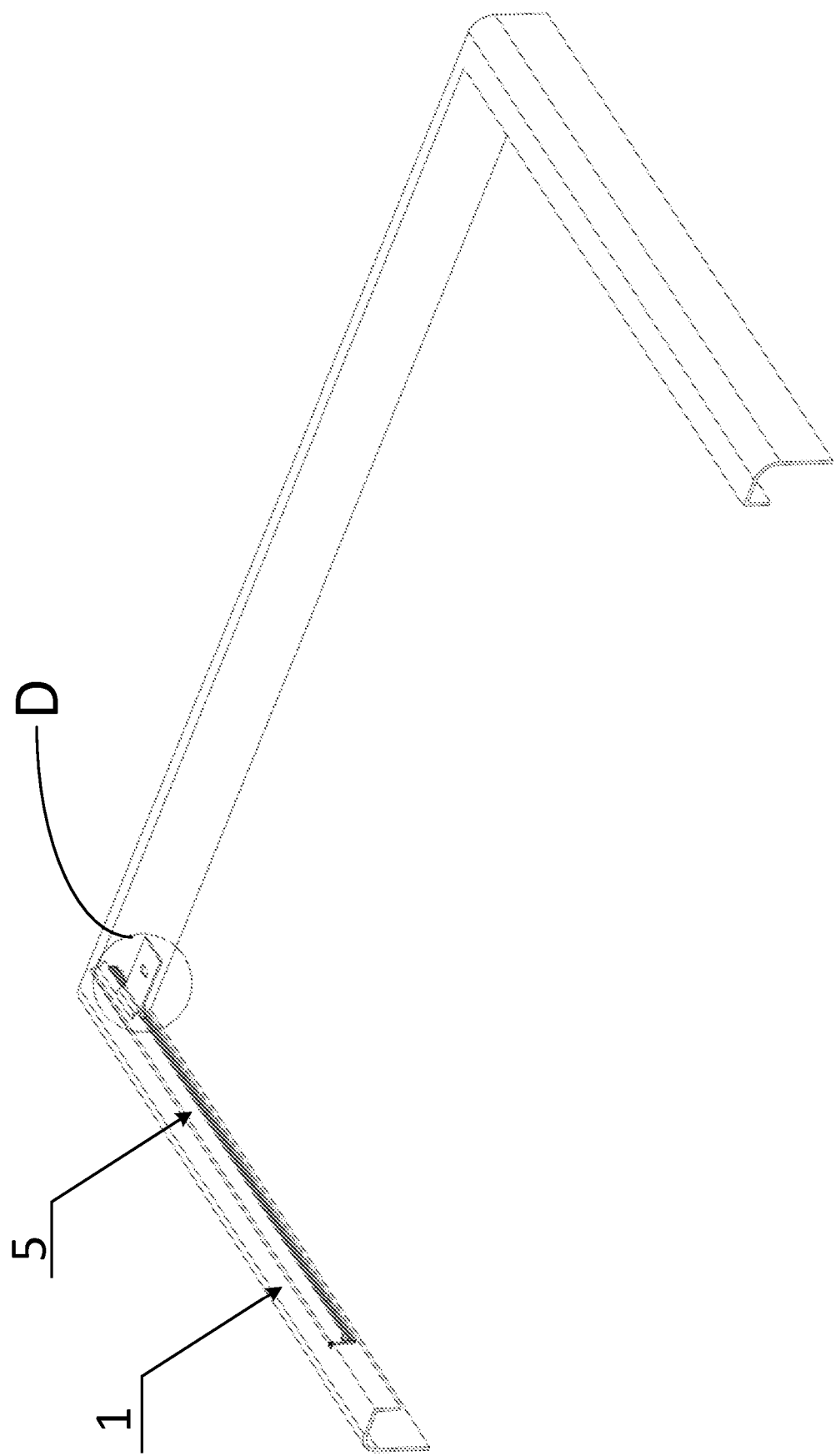
FIG. 12 is a perspective view of the vehicle carriage body with an edge member and a fixing component according to still another embodiment of the present invention.
Figure 13:
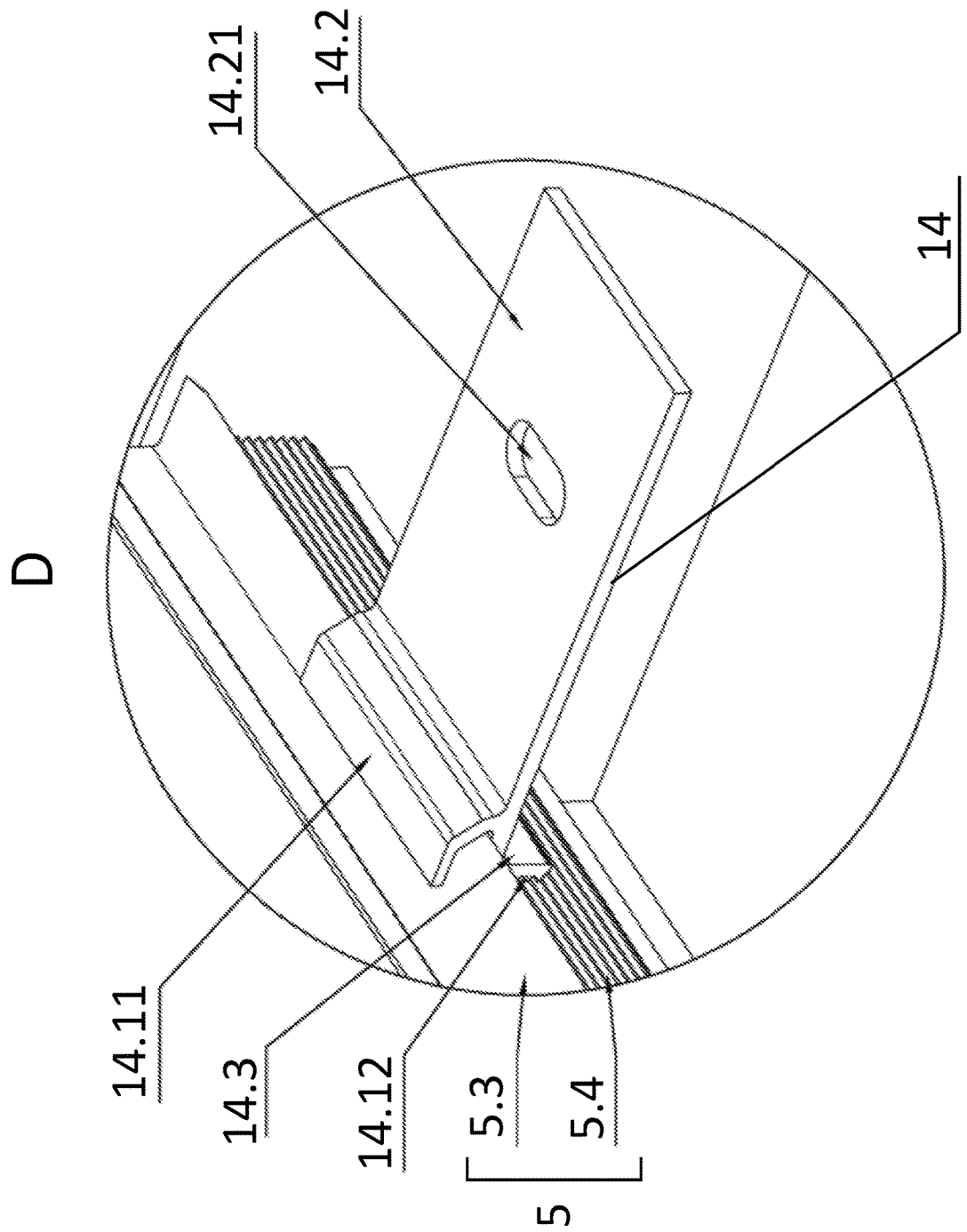
FIG. 13 is an enlarged view of region D in FIG. 12 according to the embodiment of the present invention.

FIG. 12 is a perspective view of the vehicle carriage body with an edge member and a fixing component according to still another embodiment of the present invention. For better illustration purpose, FIG. 13 shows an enlarged view of region D in FIG. 12 according to the embodiment of the present invention. These diagrams are merely examples, which should not unduly limit the scope of the claims. One of ordinary skill in the art would recognize many variations, alternatives, and modifications.

As shown in FIG. 12, the edge member 5 is disposed to one side frame of the carriage body 1. A fixing component in region D is fixed to the edge member 5 from inner side of the carriage body 1.

In a specific embodiment, as shown in FIG. 13, the fixing component in region D of FIG. 12 includes a fixing bracket 14 locked to the edge member 5. The fixing bracket 14 includes a flat press portion 14.2 with a strip hole 14.21 in the middle region, a seat portion 14.11 configured to receive a protrusion portion 5.3 of the edge member 5 to limit its vertical motion relative to the edge member 5, and a connecting edge 14.3 with a tooth portion 14.12 configured to match and engage with another tooth portion 5.4 of the edge member 5 to lock the fixing bracket 14 to the edge member 5.

As shown in FIG. 9 and FIG. 13, as an embodiment for adjusting the locking rod 13, the rectangular strip hole 14.21 is arranged with its length part along the length direction of the carriage body 1. By setting in this way, more space is available for the locking rod 13 to align with the second fixing bracket 14. As an embodiment for moving the slider 13.1 (see FIG. 11) of the locking rod 13 along the first fixing bracket 12, the second groove 12.1 is provided inside the first fixing bracket 12, which is arranged along the width direction of the carriage body 1. The upper end of the locking rod 13 is placed in the second groove 12.1, and the slider 13.1 is arranged at the upper end of the locking rod 13 to facilitate the movement of the locking rod 13 along the second groove 12.1. Specifically, the second groove 12.1 is T-shaped, and the slider 13.1 in similar shape is inserted into the second groove 12.1 to limit the vertical movement between the locking rod 13 and the first fixing bracket 12.

Figure 14:
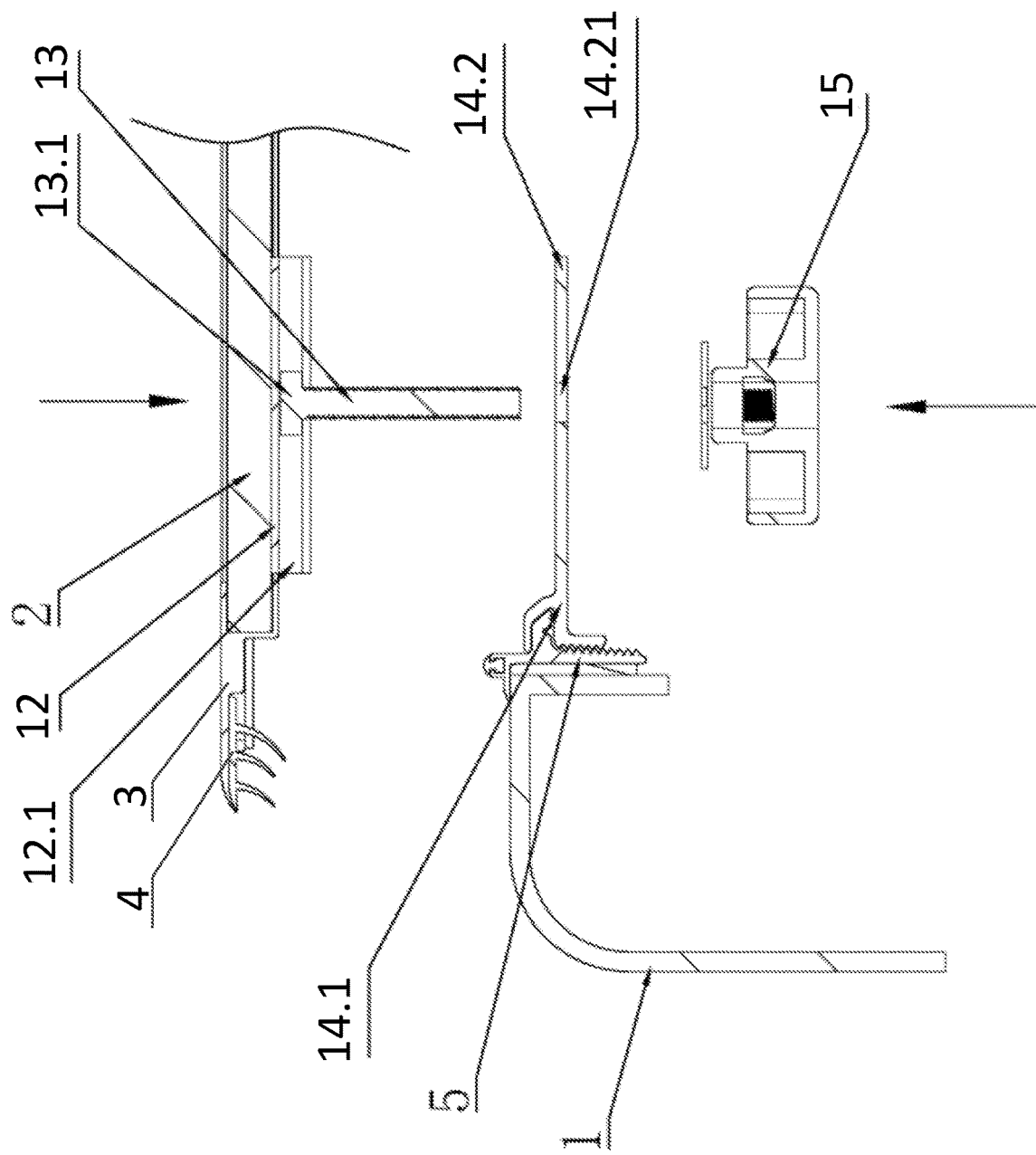
FIG. 14 is an exploded side view of multiple components for the supporting and fixing structure of the cover assembly of FIG. 2 according to the embodiment of the present invention.

FIG. 14 is an exploded side view of multiple components for the supporting and fixing structure of the cover assembly of FIG. 2 according to the embodiment of the present invention. This diagram is merely an example, which should not unduly limit the scope of the claims. One of ordinary skill in the art would recognize many variations, alternatives, and modifications. As shown, a cover assembly 2 has at least a cover panel laid flat with its side edge framed by a first edge member 3 and a first sealing member 4. At a side frame of the carriage body 1, a second fixing bracket 14 is slide along the second edge member 5 with a stop portion 14.1 engaged with a protrusion portion. The (fixed) cover panel of cover assembly 2 is disposed down with its side edge coupled by the waterproof supporting structure and its bottom surface to be pressed by a first fixing bracket 12 by a locking rod 13. A sliding setter 15 is disposed upward to couple with the locking rod 13 which is set to pass through a strip hole 14.21 in the middle of the press portion 14.2 of the second fixing bracket 14.

In some embodiments, during an assembly process of the supporting and fixing structure for the cover assembly on a carriage, the stop portion 14.1 of the second fixing bracket 14 is firstly aligned with the second edge member 5 and slide it via the protrusion portion 5.3 into the predetermined position along the length direction of the carriage body 1. Then, the fixed cover panel of the cover assembly 2 is pressed with the first fixing bracket 12 from top and the locking rod 13 is pressed with the first fixing bracket from bottom. During this process, the position of the second fixing bracket 14 can be adjusted along the second edge member in the length direction of the carriage body 1. The position of the locking rod 13 can be adjusted inside the second groove of the first fixing bracket 12 along the width direction of the carriage body 1. The locking rod 13 can pass through the strip hole 14.21 of the second fixing bracket 14 with some adjustment room. Then, the tightening device 15.1 and the washer 15.2 are placed onto the locking rod 13. Since the tightening device 15.1 has not been tightened, the fixed cover panel can be pushed to slide the second fixing bracket 14 on the second edge member 5 and adjust the position of the fixed cover plate 2 on the carriage body 1. After the position of the fixed cover panel is set, the tightening device 15.1 of fixing setter 15 can be tightened and the rivet 8 on the connecting edge 14.3 can be finally used to fix the second fixing bracket 14 to complete the assembly of the fixed cover panel of the cover assembly 2 onto the carriage body 1.

Figure 15:
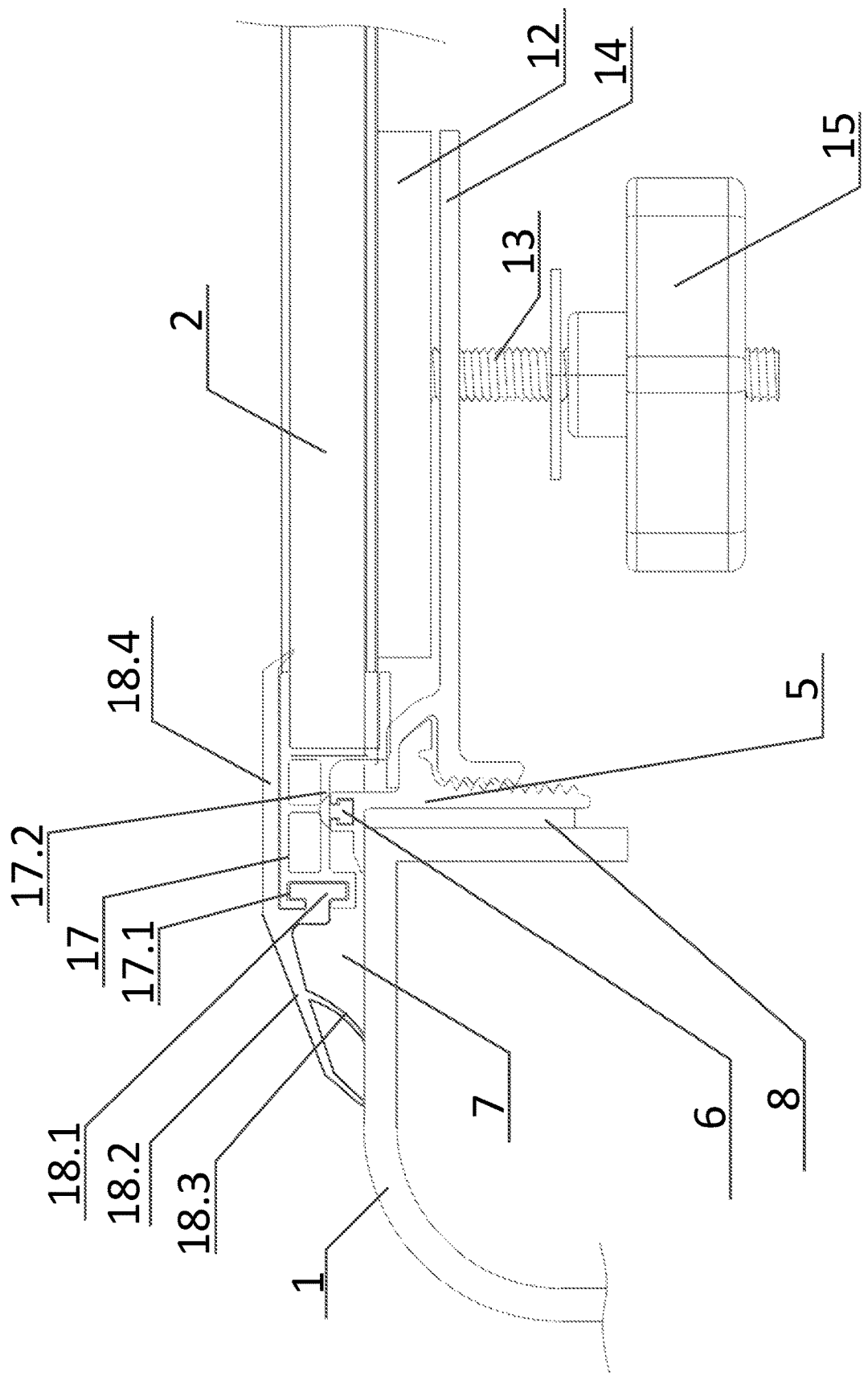
FIG. 15 is a side view of a waterproof supporting and fixing structure of the cover assembly according to another embodiment of the present invention.

FIG. 15 is a side view of a waterproof supporting and fixing structure of the cover assembly according to an alternative embodiment of the present invention. This diagram is merely an example, which should not unduly limit the scope of the claims. One of ordinary skill in the art would recognize many variations, alternatives, and modifications. In the alternative embodiment, the waterproof supporting and fixing structure is provided with a third edge member 17 disposed to side edge of the cover panel of the cover assembly 2. The third edge member 17 includes a third groove 17.1 along the length direction of the carriage body 1. The waterproof supporting and fixing structure is further provided with a fourth sealing member 18 including a connection portion 18.1 that matches and engages with the third groove 17.1 of the third edge member 17, a flat portion 18.4 covering the top part of the third edge member 17, and an extended portion 18.2 that extends its length from a joint with the connection portion 18.1 and the flat portion 18.4. The extended portion 18.2 also includes at least two second tight unit 18.3 falling onto the top surface of the side frame of carriage body 1. The second tight unit 18.3 creates a sealed space 7 bounded by the fourth sealing member 18, the top surface of the side frame of carriage body 1, and the third edge member 17 as the cover panel 2 is laid flat to cover the carriage.

In the alternative embodiment, except that the third edge member 17 and the fourth sealing member 18 are included to replace the first edge member 3 and the first sealing member 4, the waterproof supporting and fixing structure has its other components being substantially the same as those in FIG. 2. A second edge member 5 is attached to the inner edge of the side frame of the carriage body 1, providing the first groove 5.2 at top to allow a second sealing member 6 be embedded in, which supports the convex region 17.2 of the third edge member 17 and provides another sealing structure for the cover assembly 2. The second edge member 5 presses the third sealing member 8 as it is attached to the side surface of the carriage body 1. The second edge member 5 also provides a protrusion portion and a first tooth portion to allow a second fixing bracket 14 to be installed by sliding along the length direction of carriage body 1 and lock with the second edge member 5. The (fixed) cover panel of cover assembly 2 is laid down with its bottom surface being pressed by a first fixing bracket 12 using a locking rod 13 driven by a sliding setter 15.

Figure 16:
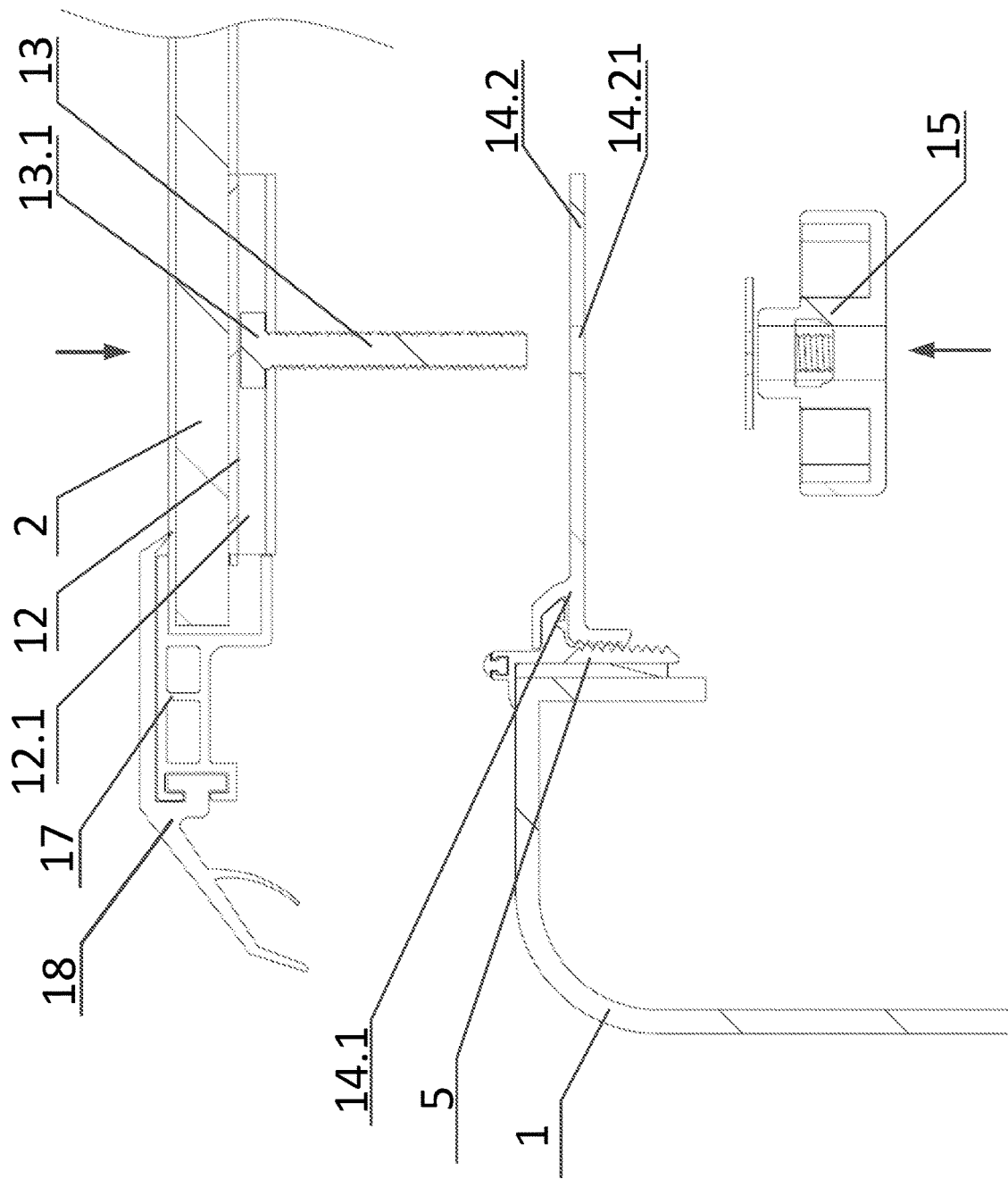
FIG. 16 is an exploded view of the waterproof supporting and fixing structure of FIG. 15 according to the embodiment of the present invention.

FIG. 16 is an exploded view of the waterproof supporting and fixing structure of FIG. 15 according to the alternative embodiment of the present invention. This diagram is merely an example, which should not unduly limit the scope of the claims. One of ordinary skill in the art would recognize many variations, alternatives, and modifications. In the alternative embodiment, as shown, a cover assembly 2 has at least a cover panel laid flat with its side edge framed by a third edge member 17 and a fourth sealing member 18. At a side frame of the carriage body 1, a second fixing bracket 14 is slide along the second edge member 5 with a stop portion 14.1 engaged with a protrusion portion. The (fixed) cover panel of cover assembly 2 is disposed down with its side edge coupled by the waterproof supporting structure and its bottom surface to be pressed by a first fixing bracket 12 by a locking rod 13. A sliding setter 15 is disposed upward to couple with the locking rod 13 which is set to pass through a strip hole 14.21 in the middle of the press portion 14.2 of the second fixing bracket 14.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A supporting structure for laying a cover panel on a carriage comprising:
    a first edge member disposed at a side edge of a first cover panel configured to be laid flat to cover the carriage;
    a first sealing member disposed partially to a bottom part of the first edge member, the first sealing member comprising at least two tight units that are deformable to form a sealing contact with top edge of the carriage as the first cover panel is laid flat on the carriage;
    a second edge member disposed to an inner side edge of the carriage, the second edge member comprising a groove on top and a protrusion portion at side towards an interior of the carriage; and
    a second sealing member disposed at the groove to support the first edge member with a tight sealing contact between the first edge member and the second edge member.

2. The supporting structure of claim 1 wherein the at least two tight units of the first sealing member are set with a separation to each other in sequential locations towards interior of the carriage and to be deformed towards exterior of the carriage.

3. The supporting structure of claim 1 wherein the at least two tight units of the first sealing member comprise three tight units, the tight unit in a middle one of the sequential locations being shorter than two tight units respectively at outer location and inner location.

4. The supporting structure of claim 1 further comprising a third sealing member configured to adhesively attach the second edge member to the inner edge of a side frame.

5. The supporting structure of claim 4 wherein the second edge member comprises an extended edge resting on the top edge of the carriage and comprises a first side edge in parallel facing the inner side edge of the carriage, the third sealing member forming tight contact horizontally with the extended edge and vertically with the first side edge.

6. The supporting structure of claim 1 wherein the second sealing member comprises a bigger part embedded into the groove of the second edge member and a smaller part with a rounded convex surface that abuts against bottom of the first edge member when the first cover panel is laid flat on the carriage.

7. The supporting structure of claim 1 wherein the first edge member is characterized by a length substantially equal to that of the side edge of the first cover panel of the cover assembly.

8. The supporting structure of claim 1 further comprising a first connecting frame attached to the first cover panel along a width direction of the carriage, and a second connecting frame attached to a second cover panel, and a hinge member having two hinge portions at two ends joined by a bending portion in the middle, the two hinge portions being embedded respectively in the first connecting frame and the second connecting frame to connect the second cover panel to the first cover panel, the bending portion being flexible to allow the second cover panel folded towards the first cover panel.

9. The supporting structure of claim 8 further comprising a stopper disposed at an end of the connecting frame next to the first edge member, the stopper comprising a first part located between the connecting frame and the hinge member, a second part located over the first sealing member, and a third part matched with the first edge member, the first part, the second part, and the third part being smoothly sliced with the first edge member and the end of the connecting frame.

10. The supporting structure of claim 9 wherein the stopper is fixed to the connecting frame by a set screw and secured from bottom by an adhesive form.

11. The supporting structure of claim 1 further comprising a fixing assembly disposed from bottom side of the first cover panel and configured to couple with the protrusion portion of the second edge member and fix the first cover panel at a position along a length direction of the carriage.

12. The supporting structure of claim 11 wherein the fixing assembly comprises:
a first fixing bracket with a sliding groove attached to the bottom side of the first cover panel and a locking rod movable along the sliding groove in a width direction of the carriage;
a second fixing bracket comprising a stop portion engaged with the protrusion portion of the second edge member to limit a relative vertical motion and a press portion configured to be pressed against the first fixing bracket; and
a fixing setter configured to screw onto the locking rod to press the first fixing bracket against the second fixing bracket.

13. The supporting structure of claim 12 wherein the stop portion comprises a seat portion configured to have a matched shape to receive the protrusion portion of the second edge member, the seat portion having two open ends allowing the second fixing bracket to engage with the second edge member by slide-in.

14. The supporting structure of claim 12 wherein the second edge member comprises a second side edge opposite to the first side edge that adhesively presses a third sealing member, the second side edge comprising a first tooth portion, the second fixing bracket comprising a connecting edge joined with the stop portion and the press portion, the connecting edge having a second tooth portion configured to match the first tooth portion to lock the second fixing bracket to the second edge member.

15. The supporting structure of claim 12 wherein the fixing setter comprises a tightening device coupled from bottom to the locking rod and a washer set between the tightening device and the press portion of the second fixing bracket.

16. A supporting structure for laying a cover panel on a carriage comprising:
a first edge member disposed at a side edge of a cover panel configured to be laid flat to cover the carriage, the first edge member comprising a first groove along a length direction of the carriage;
a first sealing member comprising a flat portion covering top part of the first edge member, a connection portion embedded to the first groove, and an extended portion having at least two tight units that are deformable to form a sealing contact with a top edge of the carriage as the cover panel is laid flat;
a second edge member disposed to an inner side edge of the carriage, the second edge member comprising a second groove on top and a protrusion portion at side towards an interior of the carriage; and
a second sealing member disposed at the second groove to support the first edge member with a tight sealing contact between the first edge member and the second edge member.

17. The supporting structure of claim 16 wherein the at least two tight units are set with a separation to each other in sequential locations towards interior of the carriage and to be deformed towards exterior of the carriage as the extended portion being laid down on the carriage by gravity.

18. The supporting structure of claim 16 wherein the second edge member is fixed to the inner side edge of the carriage by rivets.

19. The supporting structure of claim 16 further comprising a fixing assembly disposed from bottom of the first cover panel and configured to couple with the protrusion portion of the second edge member and fix the first cover panel at a position along a length direction of the carriage.

20. The supporting structure of claim 19 wherein the fixing assembly comprises:
a first fixing bracket with a sliding groove attached to the bottom side of the first cover panel and a locking rod movable along the sliding groove in a width direction of the carriage;
a second fixing bracket comprising a stop portion engaged with the protrusion portion of the second edge member to limit a relative vertical motion and a press portion configured to be pressed against the first fixing bracket; and
a fixing setter configured to screw onto the locking rod to press the first fixing bracket against the second fixing bracket.

* * * * *